United States Patent Office 3,471,426
Patented Oct. 7, 1969

3,471,426
POLYAMIDE CONTAINING DISPERSED POLYOLE-
FIN AND FATTY DISPERSING AGENT
Martin Richard Hofton, Worthing, England, assignor to
British Nylon Spinners Limited, Pontypool, England, a
corporation of Great Britain
No Drawing. Filed Oct. 6, 1965, Ser. No. 493,548
Claims priority, application Great Britain, Oct. 24, 1964,
43,464/64
Int. Cl. C08g 41/04
U.S. Cl. 260—23                                    4 Claims

ABSTRACT OF THE DISCLOSURE

A fiber-forming mixture containing polyolefin and non-compatible polymer components wherein one component exists as a dispersion in a matrix of the other, the emulsion particle size of the dispersed component being less than 30 microns in diameter.

---

This invention relates to improvements in the dispersion of polyolefins in non-compatible synthetic polymers and to the products obtained thereby and is particularly concerned with the dispersion of polyolefins in polyamides and polyesters and to the fibres and filaments obtained by the melt extrusion of such mixtures.

It is known from British patent specification No. 956,926 to manufacture mixtures of, for example, polyethylene and polyepsilon caprolactam for use as films, foils and containers by kneading the components together under high pressure. It is not, however, possible to melt spin such mixtures into filaments that can be drawn and oriented to provide fine denier filaments useful in apparel textiles such as hosiery. Attempts to spin such mixtures lead to an excessive number of threadline breaks both during spinning and drawing. Furthermore, during drawing there is a marked tendency for the filaments to fibrillate owing to the non-compatibility of the component polymers.

We have now found that mixtures of polyolefins and non-compatible polymers can be melt spun and drawn to yield textile fibres useful for apparel end uses, provided that the polyolefins and the non-compatible polymer are emulsified and the emulsion particle size of the polyolefin in a matrix of the non-compatible polymer or of the non-compatible polymer in the polyolefin, does not exceed 30 microns in average diameter.

According to one aspect of the present invention therefore there is provided a fibre forming polyolefin/non-compatible polymer mixture consisting of a dispersion of a minor amount of the polyolefin or non-compatible polymer in a matrix of the other wherein the average emulsion particle size of the minor component is not greater than 30 microns in diameter.

A fibre forming polyolefin/non-compatible polymer mixture is one that can be melt spun into drawable filaments suitable for textile end uses.

By minor amount is meant less than 50% by weight.
Preferably the mixture also contains a small amount, not more than about one percent by weight, of a dispersing agent to assist in obtaining and stabilising the correct emulsion particle size.

The non-compatible polymer is preferably a polyamide and where a dispersing agent is used it should not exceed 1.5% by weight of the polyamide, larger amounts being likely to cause degradation of the polyamide with a consequent drop in polymer viscosity.

For the purpose of this specification a non-compatible polymer is a polymer which when mixed with the polyolefin in the molten state remains in discrete portions and does not form a homogeneous mixture.

We prefer to produce the mixture containing a dispersing agent by melting the component polymers under an inert atmosphere and stirring them rapidly together in the presence of a small amount of a dispersing agent, which should not be significantly volatile under the conditions of mixing and subsequent melt spinning.

According to another aspect of the invention therefore there is provided a process for the manufacture of fibre-forming polyolefin/non-compatible polymer mixtures containing a dispersing agent wherein the molten component polymers are rapidly stirred together under an inert atmosphere in the presence of a small amount of a dispersing agent which is not significantly volatile under the conditions of mixing or melt spinning.

Preferably the polymers should have similar melt viscosities. Wide differences in melt viscosities of the polymers causes a "raining" effect i.e. violently fluctuating filament denier, on spinning.

As suitable polyolefins for employing in the present invention we instance isotatic polypropylene, low density polyethylene, (specific gravity about 0.92) made by high pressure polymerisation of ethylene, and high density crystalline polyethylene (specific gravity about 0.96) made by low pressure polymerisation of ethylene.

The non-compatible polymers include any relatively hydrophylic melt spinnable polymers examples of which are, the polyamides, including polyhexamethylene adipamide, poly-epsilon caprolactam, polyaminoundecanoic acid and their copolymers, polyesters including polyethylene terephthalate and copolyesters, polycarbonates, polyurethanes, and polyureas.

Suitable dispersing agents include long chain fatty acids such as stearic acid, oleic acid, palmitic acid and behenic acid and their salts, amides and esters and long chain fatty amines.

In general any dispersing agent containing both hydrophobic and hydrophilic groupings and having a boiling point of about 235° C. or above can be employed in the process of this invention.

For the purpose of the present invention the term "hydrophobic grouping" includes a carbon chain containing at least 14 carbon atoms and the term "hydrophilic groupings" includes carboxy, amine, amide, ester or salt end groups.

The following examples illustrate, but in no way limits the invention and the process for putting it into effect.

Example 1

75 parts by weight (71 parts by volume) of polyhexamethylene adipamide chip, having a relative viscosity of 36, and 25 parts by weight (29 parts by volume) of low density polyethylene chip of melt flow index 20, and 1 part by weight of stearic acid were blended together as follows:

The constituent polymers and the dispersing agent were tumbled together in a glass bottle and then transferred to a glass tube containing a stainless steel helical stirrer. The mixing tube was evacuated and refilled with nitrogen to remove all oxygen, and throughout the mixing and subsequent cooling a steady flow of nitrogen was maintained over the surface of the mix. The tube was immersed in an oil bath at a temperature of 280–285° C., i.e. 15°–20° above the melting point of the highest melting component, and rapid stirring commenced as soon as the polymers had melted and continued for 30 minutes. At the end of the mixing time the tube was removed from the oil bath and allowed to cool. The solid polymer blend was then removed and crushed.

The average particle diameter of the emulsion, i.e. of polyethylene in nylon, was obtained by viewing cross-sections of the chips under a microscope containing a graticule eyepiece and taking the mean diameter of the particles in the area of the circle containing the graticule scale as viewed through the microscope. In this instance the average particle diameter was 12.8 microns.

The polymer blend was melt spun into 6 filaments at 275° C. using a laboratory spinning machine. The filaments were subsequently drawn at a draw ratio of 4.75 over a hot plate at 100° C. to yield a yarn having the following physical properties, Denier: 26.6 i.e. about 4 d.p.f.
Tenacity: 3.2 gm./denier
Extension to break: 12.25%
Initial modulus: 22.2 g./d./100% extension The filaments showed no tendency to fibrillate during or after drawing.

The relative viscosity of a polyamide is determined by measuring the viscosity of an 8.4% w./w. solution of the polyamide in formic acid and comparing this with the viscosity of formic acid under standard conditions. The melt flow index of polyethylene is determined according to B.S.S. No. 2782, Method 105C.

Polyhexamethylene adipamide of relative viscosity 36 and polyethylene of melt index 20 have similar melt viscosities, about 800 poises, at 275° C.

In the following Examples 2–7 the polymer constituents of Example 1 were mixed together in the same proportions by weight using different dispersing agents and subsequently spun and drawn by the methods described in Example 1. The details of these experiments are given in the table below.

The blend was spun into a 6 filament yarn at 245° C. which was subsequently drawn at a draw ratio of 4.75 over a hot plate at 180° C. to yield a drawn yarn having the following properties:

Denier _____ 26.9
Extension to break _____percent__ 16.0
Tenacity _____g./d__ 3.8
Initial modulus _____g./d./100% extension__ 20.9

Example 9

75 parts by weight (71 parts by volume) of polyaminoundecanoic acid chip having an inherent viscosity of 0.63 and 25 parts by weight (29 parts by volume) of low density polyethylene chip having a melt flow index of 20 were blended together as in Example 1 at a temperature of 210° C. to give an emulsion of polyethylene in polyaminoundecanoic acid having an average particle diameter of 9.6 microns. The blend was spun into a 6 filament yarn at 280° C. and subsequently drawn at a draw ratio of 4.75 over a hot plate at 100° C. to yield a drawn yarn having the following physical properties:

Denier _____ 27.5
Extension to break _____percent__ 19
Tenacity _____g./d__ 4.0
Initial modulus _____g./d./100% extension__ 25.8

Example 10

80 parts by weight (77.5 parts by volume) of polyepsilon caprolactam having a relative viscosity of 65.5, 20 parts by weight (22.5 parts by volume) of high density polyethylene and 1 part by weight of "Armid O" were blended together as in Example 1 at a temperature of 280–285° C. to yield an emulsion of polyethylene in polyepsilon caprolactam having an average particle diameter of 4.8 microns. The blend was spun into 6 filaments at a temperature of 240° C. and subsequently drawn at a draw ratio of 4.0 over a hot plate at 160° C. to yield a drawn yarn having the following physical properties:

Denier _____ 25.7
Extensibility _____percent__ 23.4
Tenacity _____g./d__ 3.4
Initial modulus _____g./d./100% extension__ 15.9

What I claim is:

1. A fiber-forming mixture containing polyamide having recurring amide groups as integral parts of the polymer chain together with a polyolefin, the polyolefin comprising less than 50 percent by weight of the mixture and existing as a dispersion in a matrix of the polyamide, the emulsion particle size of the dispersed polyolefin being

|         |                   |                                    |            | Physical properties of yarn |                     |                                          |
|---------|-------------------|------------------------------------|------------|-----------------------------|---------------------|------------------------------------------|
| Example | Dispersing agent  | Av. particle diameter, microns    | Draw ratio | Denier | Tenacity, g./d. | Extension to break, percent | Initial modulus, g./d./100% extension |
| 2       | "Armid O" [1]     | 8.1                                | 5.75       | 21.1   | 5.5             | 13.0                        | 24.1                                     |
| 3       | Sodium stearate   | 16.0                               | 5.0        | 20.5   | 4.1             | 17.0                        | 23.7                                     |
| 4       | Stearamide        | 21.8                               | 5.5        | 20.0   | 5.6             | 15.2                        | 24.2                                     |
| 5       | Sodium oleate     | 13.9                               | 4.5        | 17.0   | 3.0             | 13.7                        | 20.6                                     |
| 6       | Behenic acid      | 14.6                               | 4.0        | 30.3   | 2.4             | 25.3                        | 16.6                                     |
| 7       | None              | 32.5                               |            | Could not be spun into drawable filaments |  |  |  |

[1] Armid "O" consists of a mixture of long chain fatty acid amides comprising mainly Oleamide.

Example 8

75 parts by weight (71 parts by volume) of polyepsilon caprolactam chip having a relative viscosity of 32, 25 parts by weight (29 parts by volume) of low density polyethylene chip having a melt flow index of 20 to 1 part by weight of "Armid O" were mixed together as described in Example 1 at a temperature of 250° C. to yield a polyethylene in polycaprolactam emulsion having an average particle diameter of 13.2 microns.

less than 30 microns in diameter, said mixture including not more than about 1.5 percent by weight of a dispersing agent based on the weight of the polyamide, said dispersing agent containing both hydrophobic and hydrophilic groupings and having a boiling point of at least 235° C., said hydrophobic grouping of said dispersing agent including a carbon chain containing at least 14 carbon atoms and said hydrophilic grouping including a member selected from the class consisting of carboxy, amine, amide, ester and salt end groups.

2. A mixture according to claim 1 wherein the polyolefin is high or low density polytthylene.

3. A mixture according to claim 1 wherein the polyolefin is high or low density polyethylene 4. The fiber-forming mixture of claim 1 wherein the dispersing agent is present in amounts less than 1 percent.

References Cited

UNITED STATES PATENTS

| | | | |
|---|---|---|---|
| 3,093,255 | 6/1963 | Mesrobian et al. | 260—857 |
| 3,262,989 | 7/1966 | Brignac | 260—857 |
| 3,272,890 | 9/1966 | O'Leary | 260—859 |
| 3,312,755 | 4/1967 | Cappuccio et al. | 260—859 |
| 3,326,826 | 6/1967 | Cohen | 260—23 |
| 3,330,796 | 7/1967 | Mock et al. | 260—32.6 |
| 3,330,899 | 7/1967 | Fukushima et al. | 260—857 |
| 3,342,762 | 9/1967 | Crovatt | 260—18 |
| 3,351,676 | 11/1967 | Saunders et al. | 260—859 |

DONALD E. CZAJA, Primary Examiner

R. A. WHITE, Assistant Examiner

U.S. Cl. X.R.

260—32.6, 857